United States Patent
Irons et al.

(10) Patent No.: US 8,787,616 B2
(45) Date of Patent: Jul. 22, 2014

(54) DOCUMENT PROCESSING SYSTEM AND METHOD

(75) Inventors: Steven William Irons, Phoenix, AZ (US); Anthony Patrick Argenziano, Phoenix, AZ (US); Eric Richard Lynn, Phoenix, AZ (US)

(73) Assignee: DocSolid LLC, Phoenix, AZ (US)

( * ) Notice: Subject to any disclaimer, the term of this patent is extended or adjusted under 35 U.S.C. 154(b) by 1033 days.

(21) Appl. No.: 12/790,232

(22) Filed: May 28, 2010

(65) Prior Publication Data

US 2011/0293135 A1  Dec. 1, 2011

(51) Int. Cl.
*G06K 9/00* (2006.01)
*H04N 1/32* (2006.01)
*H04N 1/21* (2006.01)

(52) U.S. Cl.
CPC ......... *H04N 1/32133* (2013.01); *H04N 1/2166* (2013.01); *H04N 2201/3269* (2013.01)
USPC ........................................................ 382/101

(58) Field of Classification Search
None
See application file for complete search history.

(56) References Cited

U.S. PATENT DOCUMENTS

| | | | |
|---|---|---|---|
| 6,192,165 B1* | 2/2001 | Irons | 382/306 |
| 6,427,032 B1* | 7/2002 | Irons et al. | 382/306 |
| 6,674,924 B2* | 1/2004 | Wright et al. | 382/306 |
| 7,182,259 B2* | 2/2007 | Lubow et al. | 235/462.01 |
| 7,606,831 B2* | 10/2009 | Quinn et al. | 1/1 |
| 7,798,417 B2* | 9/2010 | Snyder et al. | 235/494 |
| 8,194,274 B2* | 6/2012 | Babbrah et al. | 358/1.15 |
| 8,375,324 B1* | 2/2013 | Zubizarreta et al. | 715/809 |
| 2002/0111960 A1* | 8/2002 | Irons et al. | 707/204 |
| 2003/0115162 A1* | 6/2003 | Konick | 705/404 |
| 2006/0184522 A1* | 8/2006 | McFarland et al. | 707/5 |
| 2008/0239328 A1* | 10/2008 | Mariotti et al. | 358/1.1 |

* cited by examiner

*Primary Examiner* — Nancy Bitar
(74) *Attorney, Agent, or Firm* — Martin & Associates, LLC; Derek P. Martin

(57) ABSTRACT

A software tool referred to as a "mailman" monitors certain folders on a network for new scanned documents. A user places a stamp on a document, then uses a digital copier to store the scanned document to one of the monitored folders on the network. When the mailman sees a new scanned document in one of the folders it is monitoring, the mailman retrieves the document, processes the document to determine the number on the stamp, queries a Post Office application for document processing instructions corresponding to the stamp number, performs any required processing of the document, then delivers the processed document to the Post Office. When the Post Office receives the processed document, the processed document is stored in a document repository in the Post Office, and is processed by the Post Office according to document processing instructions corresponding to the stamp number.

31 Claims, 13 Drawing Sheets

Sample Document Processing Instructions

Format for document
    file type
        plain text, word processing, PDF, PDF+text,
        TIFF, .bmp, .jpg, etc.
    compressed?
    convert to black and white?
    encrypted?
    password protected?
    size Document processing options
    redact stamp on delivered document
    e-mail copy to sender
    send file as link or attachment?
    convert to different format? (AirMail2Convert)
    apply default
    apply to next document only
    apply to next N documents
    apply for documents scanned to Y date
    apply to document for rest of stamps on roll
    put document e-mailed to others in
      Sent Items folder Destination for document
    user's e-mail (AirMail2Me)
    file (AirMail2Folder)
    other e-mail (AirMail2You)

| — | AirMail2 Web Client | ▼ ▲ |

File　Edit　View　Insert　Format　Tools　Window　Help

| AirMail2Me | AirMail2Folder | AirMail2You | AirMail2Convert |

File to Convert: \server\AirMail2\Users\jim\pleading55.pdf

Document Settings

| File Format | PDF ▼ |
| Size | Medium ▼ |

Compress ☐

Convert to Black and White ☐

Send File As ☒ Link ☐ Attachment

Message Settings (Optional)

From: Mailman@company.com
To: jim@company.com
Subject: Converted Document

User Body: Here's the Document
System Body: Document Delivered by AirMail2

[Restore Defaults] [Save as New Default] [Apply to Next N Documents] [Apply Only to Next Document]

FIG. 13

DOCUMENT PROCESSING SYSTEM AND METHOD

BACKGROUND

1. Technical Field

This disclosure generally relates to processing of documents, and more specifically relates to processing of scanned documents in computer systems.

2. Background Art

Computer systems have vastly improved the efficiency of many modern workers by providing ways to quickly and efficiently generate and handle electronic documents. Many software tools have been developed that generate and/or process electronic documents in various ways, including word processors, spreadsheets, databases, scanning software, web page development systems, content management systems, hypertext markup language (HTML), extensible markup language (XML), etc. It has long been the goal of many people in the information processing field to realize a "paperless office", which means an office where physical paper documents are completely replaced with electronic documents. One impediment to realizing the goal of a paperless office is the great number of different types of documents that a typical business receives from outside sources that must be processed.

When a paper document is received by a business that is striving to realize the goal of a paperless office, the paper document is typically scanned into electronic form. However, in order for the document to be digitally filed in a structured filing system, the document must have indexing information added to the scanned document. Examples of indexing information include: document type, customer number, contract number, dollar amount, and other suitable metadata that describes the document. The process of manually entering indexing information for each scanned document has been a significant bottleneck in the realization of the goal of a paperless office. For each paper document that is scanned, a human operator must scan the document, then manually enter indexing information to allow the document processing systems to recognize, store and retrieve the new document. With a company that receives hundreds or thousands of paper documents each day, this requires a dedication of significant resources to scan the documents and enter the corresponding index information. Many companies prefer to do business by processing the papers instead of dedicating the resources to adapt their business systems to converting the papers to electronic documents, then processing the electronic documents.

Various systems have been developed to allow a user to more efficiently enter indexing information for a document. For example, U.S. Pat. Nos. 6,192,165 and 6,427,032 owned by ImageTag, Inc. disclose systems in which a user creates index information in a record in a database for a paper document before the document is scanned, places a label with a unique identifier on the paper document, then scans the paper document. The system detects the label with the unique identifier, locates the index record in the database that corresponds to the unique identifier, then stores the scanned document with the index record in the database.

Many offices still process a significant number of paper documents in their day-to-day operations. Many are not making efforts to get upgraded to process electronic documents instead of paper documents. Yet many people, even in environments that have little infrastructure for processing electronic documents, still need the ability to scan a paper document into electronic form, then process the electronic document in some fashion. For example, let's assume an attorney hires a draftsman to create patent drawings for a particular client, and receives a paper invoice from the draftsman for creating the drawings. The attorney may want to scan the paper invoice, then e-mail the paper invoice to the client. Most offices today use digital copiers that scan paper documents and produce from the paper documents one or more electronic documents. In a typical office environment with a digital copier, the attorney in the example above would have to scan the document to electronic form by typing a series of instructions at the digital copier keypad, locate the electronic document on the network, copy or move and possibly rename the electronic document to a desired location, create an e-mail to the client, attach the electronic document to the e-mail to the client, then send the e-mail to the client. This process is very daunting for many office workers, especially those who are not very technically-inclined. The attorney may have to seek help from the firm's information technology (IT) department to determine where on the company's network to find the documents for a particular digital copier on the network. In addition, the user may have to take different steps depending on different models of digital copiers that are available. There are so many hurdles in accomplishing this simple task of e-mailing a paper invoice to a client that the attorney may deem it more efficient to simply fax the invoice to the client. A fax of the invoice is yet another paper document that now must be processed by the client, which further exacerbates the goal of reducing paper in an office's workflow. Without a way to easily process scanned documents using software that is user-friendly and very easy to use, many workers will not have the skill or patience to process scanned documents using known tools.

BRIEF SUMMARY

A document processing system uses small adhesive labels (referred to herein as "stamps") that have a common number assigned to a particular user. The user uses a browser interface to a web-based application referred to as a "post office" to enter the stamp number currently assigned to the user, and to enter user preferences for processing and delivering a document. A software tool referred to herein as a "mailman" application monitors certain folders on the network for new scanned documents. When a user needs to process an electronic document, the person places one of the user's stamps on the document. The user then uses a digital copier and invokes a function on the copier keypad to store the scanned document to one of the folders on the network being monitored by the mailman. When the mailman sees a new document in one of the folders it is watching, the mailman retrieves the document, processes the document to determine the number on the stamp, queries the post office for document processing instructions corresponding to the stamp number, performs any required processing of the document, then delivers the processed document to the post office. When the post office receives the processed document, the processed document may be further processed, and the processed document is stored in a document repository in the post office. The post office may also deliver the processed document according to document processing instructions generated from the user preferences corresponding to the stamp number. Functions supported by the document processing system include e-mailing the electronic document to the user, e-mailing the electronic document to someone else, storing the electronic document to a network location, and converting the electronic document to a different format. The document processing system thus provides a very simple tool that allows a user to easily scan a paper document into electronic form, then process the electronic document according to the user's needs.

This can be accomplished without the user interacting with software for each scan, and by minimizing key entry at the digital copier keypad.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 9 shows sample document processing instructions for a scanned document;

FIG. 13 shows a sample user interface for setting user preferences for an AirMail2Convert function;

Figure 2:
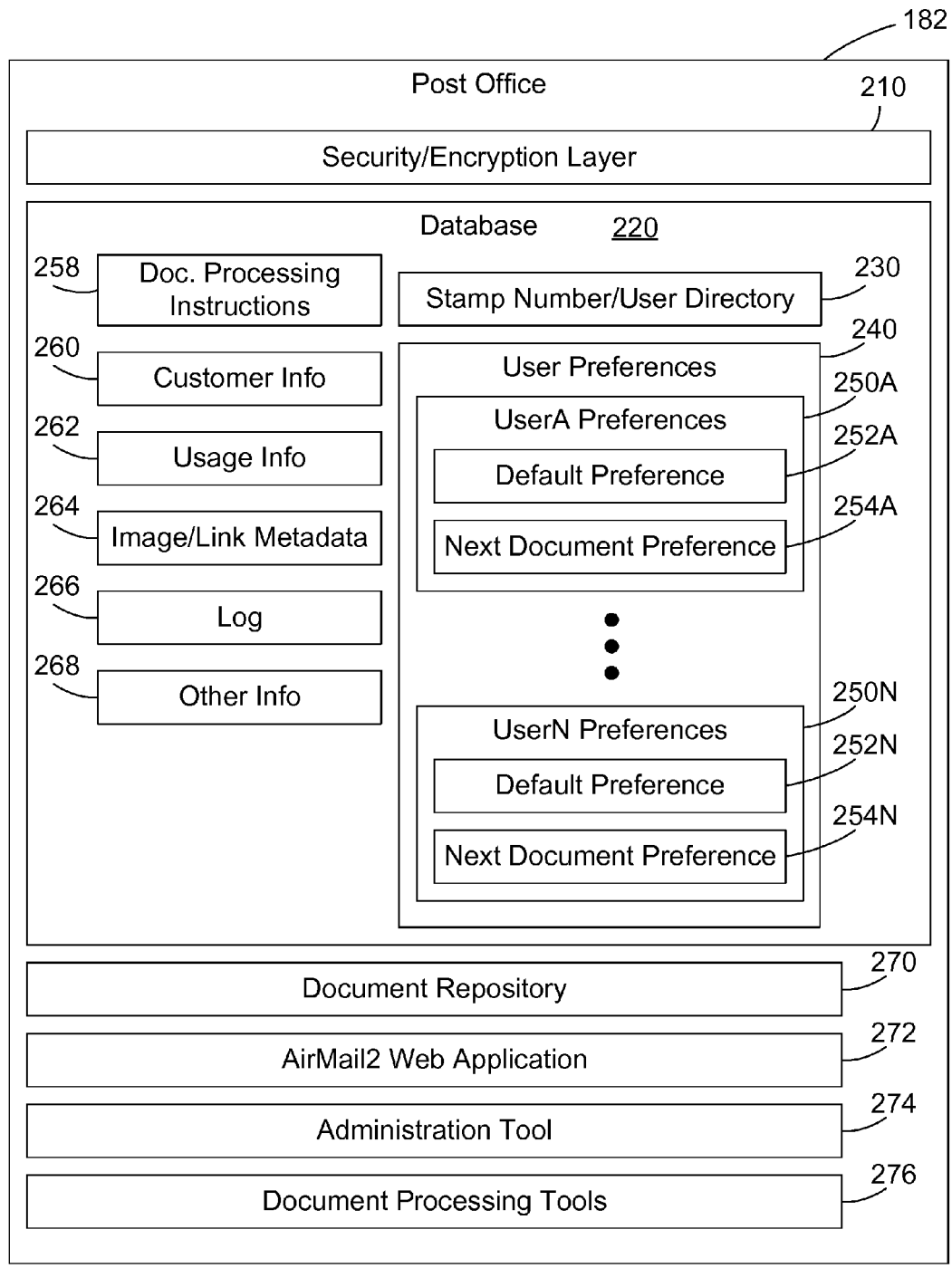
FIG. 2 is a block diagram showing details of the post office shown in FIG. 1.
Figure 7:
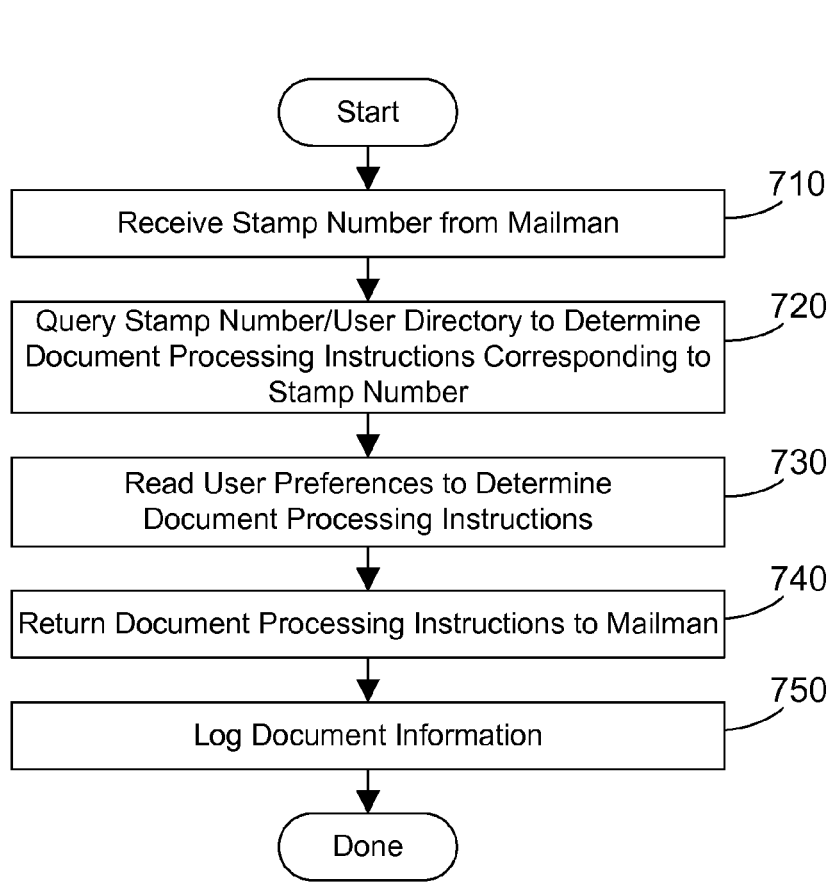
FIG. 7 is a flow diagram of a first method performed by the post office.
Figure 15:
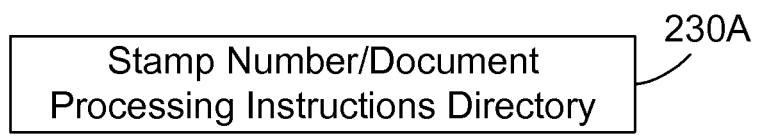
Figure 16:
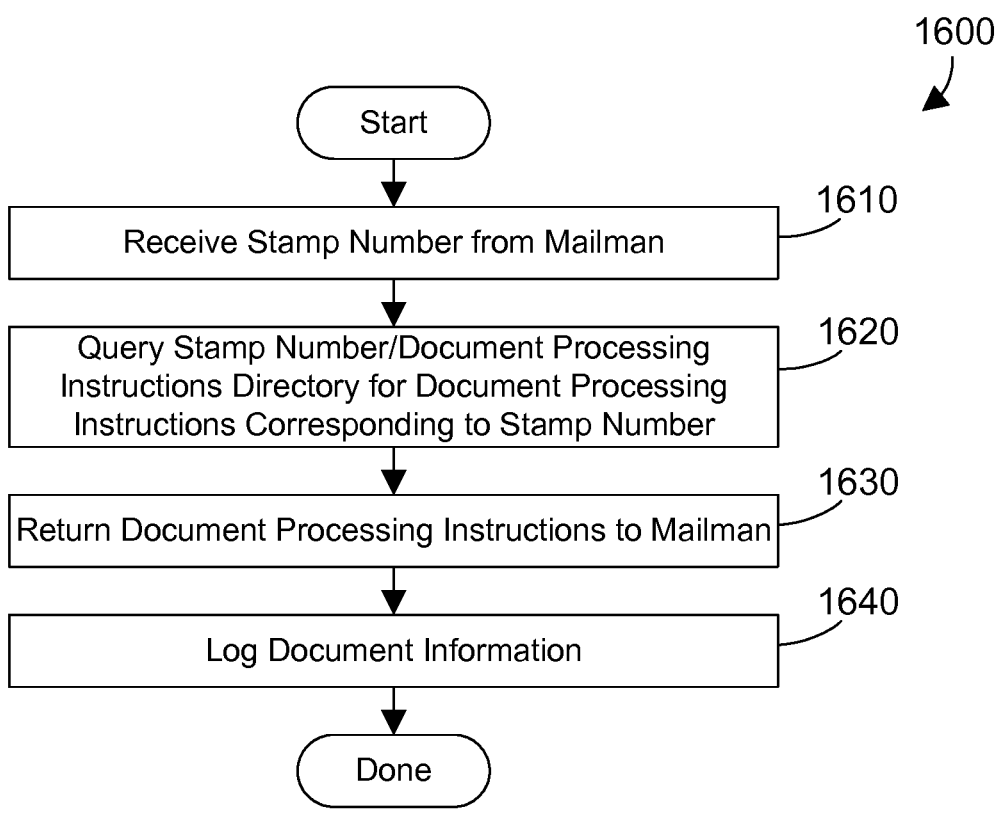

FIG. 15 is a block diagram showing a stamp number/document processing instructions directory 230A that replaces the stamp number/user directory 230 and document processing instructions 258 in FIG. 2 in one specific implementation; and FIG. 16 is flow diagram of a method that replaces method 700 in FIG. 7 in one specific implementation.

DETAILED DESCRIPTION

The claims and disclosure herein provide a document processing system that is very easy to use, provides great functionality, with a minimum of software running on a company's servers. A very lightweight mailman application monitors certain network folders for new scanned documents. A user uses a web browser interface to a web application known as the post office to setup user preferences and to enter the number on the roll of stamps the user is going to use. The user may then place a stamp on a paper document, and scan that document to one of the network folders monitored by the mailman. When a new scanned document arrives, the mailman reads the stamp number on the document and sends the stamp number to the post office, which returns to the mailman document processing instructions for the document based on the user preferences corresponding to that stamp number. The mailman then sends the scanned document to the post office. The post office may perform additional processing on the scanned document, and may then deliver or process the document according to the document processing instructions. The document processing system supports e-mailing the document to the user, e-mailing the document to someone else, storing the document to a network location, and converting the document to a different format. Of course, other functions not listed above are equally within the scope of the disclosure and claims herein.

Figure 1:
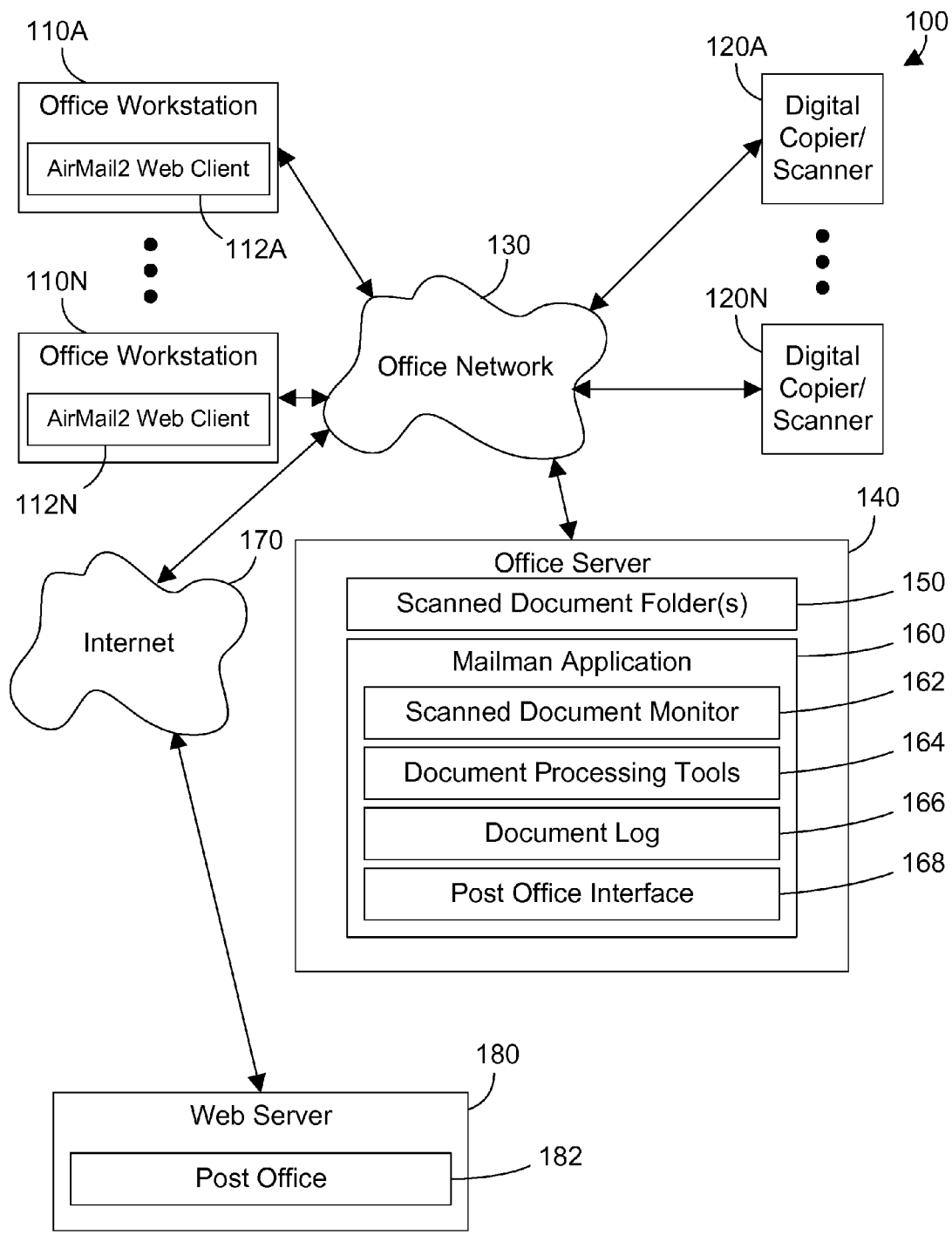
FIG. 1 is a block diagram of a document processing system.

Referring to FIG. 1, a networked computer system 100 includes multiple office workstations, shown in FIG. 1 as office workstation 110A, . . . , 110N, coupled to an office network 130. Multiple digital copiers/scanners 120A, . . . , 120N are also coupled to office network 130. Digital copiers/scanners 120A, . . . , 120N may include any suitable device for scanning a document, including stand-alone scanners, digital copiers, multifunctional printers, etc. The office network 130 is also coupled to a web server 180 via Internet 170. Web server 180 includes a Post Office 182 described below in more detail with reference to FIGS. 2, 4, 7 and 8.

The office network 130 is also coupled to an office server 140. The office server 140 includes one or more scanned document folders 150, and a mailman application 160. The scanned document folders 150 include network locations to which scanned new documents from the digital copiers/scanners 120A, . . . , 120N may be stored. Scanned document folder(s) 150 may include any suitable network location, including without limitation network folders, database tables, or any other data structure accessible on the office network 130. In the most preferred implementation, the scanned document folder(s) 150 include one or more folders in a directory that are preferably dedicated to the document processing system disclosed herein. When a person wants to process a document using the document processing system, the user invokes a function on one of the digital copier/scanners 120A, . . . , 120N. By invoking the function, the scanned document is stored to a scanned document folder 150 on the network. The mailman application 160 includes a scanned document monitor 162 that monitors the scanned document folders 150. When a new document is stored to one of the scanned document folder(s) 150, the scanned document monitor 162 detects the new document, causing the mailman application 160 to process the new document. The mailman application 160 includes document processing tools 164 for processing the new document, a document log 166 that logs the processing of the new document, and a post office interface 168 that includes logic and/or information needed to access the post office 182. This logic may include any suitable information, including an encryption key, a password, a username, an access code, etc. The function of the mailman application 160 is discussed in more detail below with reference to FIG. 6.

Figure 5:
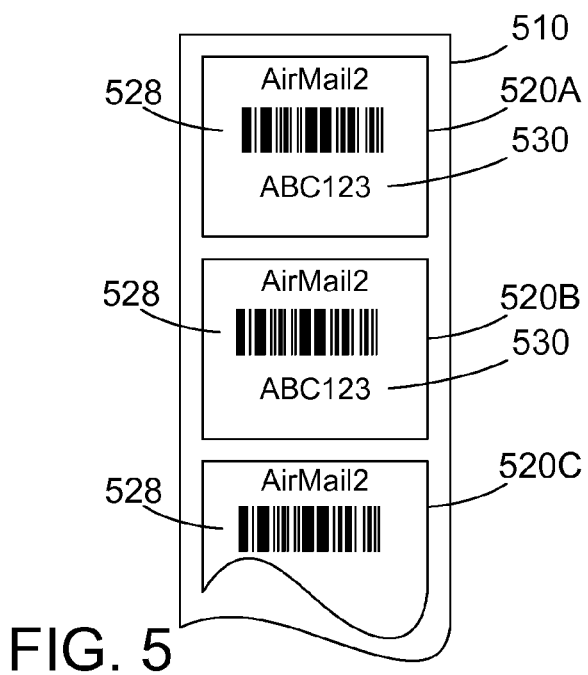
FIG. 5 shows part of a roll of stamps, with each stamp including a common stamp number.

FIG. 2 shows one suitable implementation for the post office 182 shown in FIG. 1. The post office 182 preferably includes a security/encryption layer 210, which provides required security and/or encryption to access the post office 182. The post office interface 168 in the mailman application 160 (shown in FIG. 1) includes the logic and/or information needed to satisfy the security/encryption layer 210 in the post office. A database 220 includes any suitable information that may need to be stored in or by the post office 182, including a stamp number/user directory 230, user preferences 240, document processing instructions 258, customer information 260, usage information 262, image/link metadata 264, a log 266, and other information 268. The stamp number/user directory 230 in the simplest implementation contains data pairs that correlate stamp numbers to users. The correlation of stamp numbers to users is preferably performed by the user accessing the post office 182 via a web interface from an office workstation, such as the AIrMail2 web client 112A shown in workstation 110A in FIG. 1. The user may enter the stamp number for the current roll of stamps, which will cause an entry in the stamp number/user directory 230 that correlates the user with that particular stamp number. Referring to FIG. 5, in the most preferred implementation, a roll of stamps 510 has many stamps 520A, 520B, 520C, etc. that each includes the same stamp number in both barcode form 528 and in alphanumeric form 530 on each stamp. For the specific stamps shown in FIG. 5, the stamp number on each stamp in the roll 510 is ABC123. A suitable entry in the stamp number/user directory 230 would include the stamp number ABC123 along with the username of the user to whom the stamp number has been assigned.

The database 220 also includes user preferences 240. User preferences may be in any suitable form and may include any preference for a user that may be specified by a user or needed by the document processing system disclosed and claimed herein. In the specific implementation shown in FIG. 2, there are multiple user preferences 250A, . . . , 250N. Each set of user preferences preferably include a default preference and a next document preference. Thus, UserA Preferences 250A include a default preference 252A and a next document preference 254A. In similar fashion, UserN Preferences 250N include a default preference 252N and a next document preference 254N.

Document processing instructions 258 are preferably generated from the user preferences for the user corresponding to a stamp. Document processing instructions may include any suitable information for processing a document, including the format for the document, options for processing the document, and the destination for the document. Customer information 260 provides information about customers that access the post office 182, and may include billing information for the customer. Usage information 262 provides information regarding how the document processing system is being used by users, and may include statistics regarding which users have used the system, how often they have accessed the system, the type of operations performed, and other suitable data.

Image/Link Metadata 264 provides metadata that describes documents stored in the document repository 270. For example, image/link metadata may include a link to a document in the document repository 270. If a user's preferences indicate to e-mail the next document to the user with a link, instead of e-mailing the document itself, the e-mail will contain a link in the image/link metadata 264 that allows the user to access a document in the document repository 270 by clicking on the link in the e-mail. E-mailing a link instead of the document places the storage requirements for the scanned documents on the post office and significantly reduces the data sent in each e-mail.

The log 266 tracks how the post office 182 has been used. Log 266 allows tracking across different organizations and departments in a company. One feature of log 266 is to track when a document in the document repository 270 has been accessed. For example, if a document is e-mailed to a different user with a link to the document, the log 266 can track whether the recipient of the e-mail has accessed the document or not. Information in the log 266 could thus be used to generate a "viewed receipt" to the user to indicate the recipient of the document link accessed the document. Database 220 may also include other information 268, which can be any suitable information that relates in any way to the post office 182 or the entire system 100 shown in FIG. 1.

The document repository 270 contains scanned documents received from a mailman application. AirMail2 Web Application 272 is software that provides the functions of the post office 182 described herein. Administration tool 274 is software that is used to setup and administrate the post office 182. For example, administration tool 274 may be used by an administrator to define what user preferences may be stored in database 220, to define the type of security and/or encryption in the security/encryption layer 210, to define what document processing tools 276 are available, and to define how long documents are maintained in the post office before being discarded. The document processing tools 276 include any software that may be needed to perform processing on a document. Examples of suitable document processing tools include: a tool for converting between different file types (e.g., word processing, PDF, TIFF, .jpg, etc.); a tool for performing optical character recognition (OCR) on a document; a tool for compressing and uncompressing document data; a tool to convert a document with color to black-and-white; a tool for changing the resolution (i.e., size) of a document; a tool for redacting a stamp on a scanned document; a tool for generating a link for a scanned document; a tool that supports putting a document e-mailed to others in the sender's "Sent Items" folder; and a tool for specifying different destinations for a document (e.g., e-mail of user, e-mail of another, a network location). These are examples of suitable document processing tools 276. The document processing tools 276 may include any suitable tool for processing a scanned document, for handling a scanned document, or for delivering a scanned document or a link to a scanned document.

Figure 3:
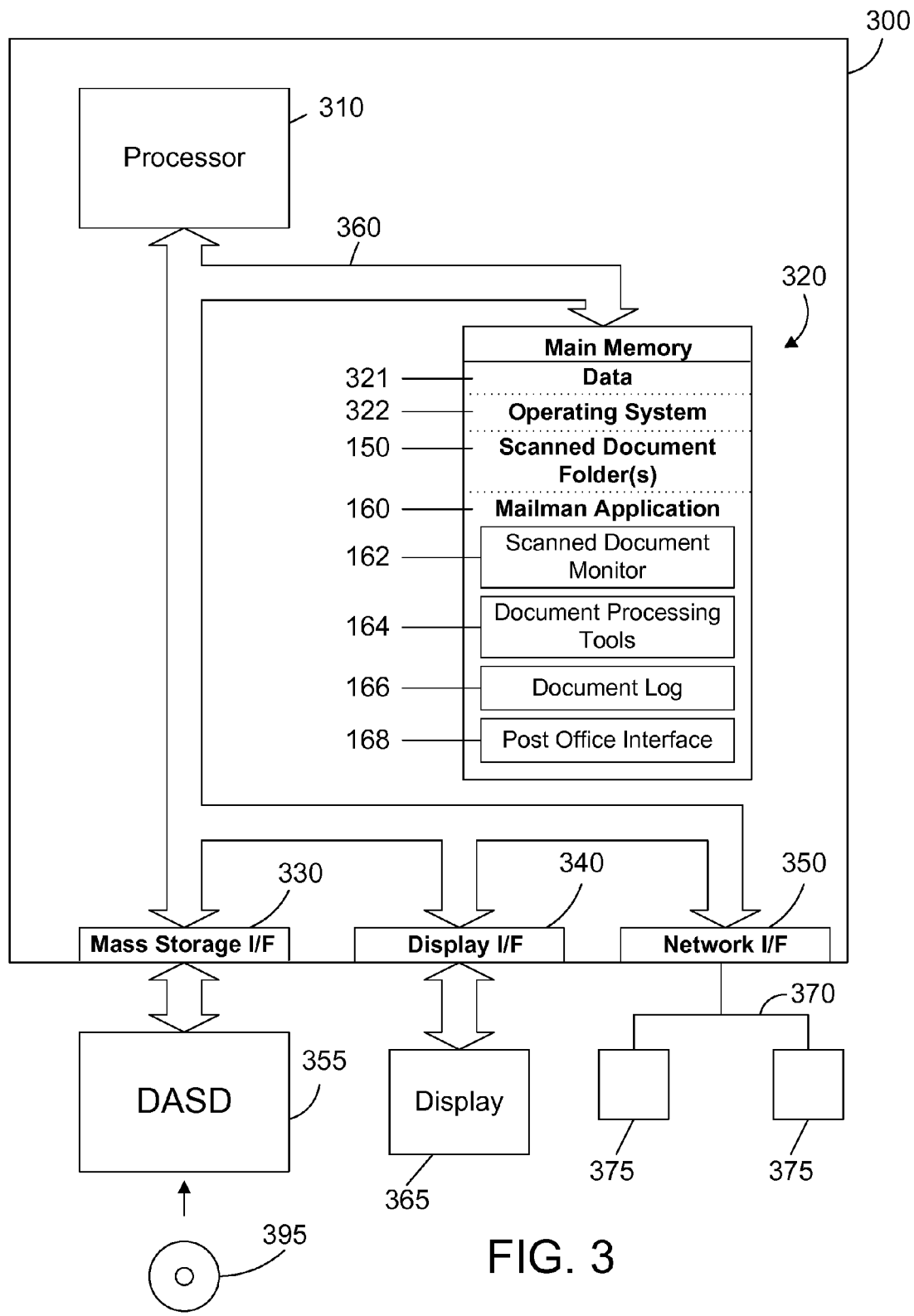
FIG. 3 is a block diagram of one suitable implementation for the office server computer system shown in FIG. 1.

Referring to FIG. 3, computer system 300 is one suitable implementation of the office server computer system 140 shown in FIG. 1. Computer system 300 could be any suitable server system, such as an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 3, computer system 300 comprises one or more processors 310, a main memory 320, a mass storage interface 330, a display interface 340, and a network interface 350. These system components are interconnected through the use of a system bus 360. Mass storage interface 330 is used to connect mass storage devices, such as a direct access storage device 355, to computer system 100. One specific type of direct access storage device 355 is a readable and writable CD-RW drive, which may store data to and read data from a CD-RW 395.

Main memory 320 preferably contains data 321, an operating system 322, one or more scanned document folders 150, and mailman application 160. Data 321 represents any data that serves as input to or output from any program in computer system 300. Operating system 322 is a multitasking operating system. Scanned document folder(s) 150 represent one or more folders accessible via office network 130 that are the destination for documents scanned by the digital copier/scanners, and that need to be processed by the document processing system 100. While scanned document folder(s) are shown as part of computer system 300 in FIG. 3, one or more scanned document folders could alternatively or in addition reside on a separate computer system on office network 130. The mailman application 160 includes the scanned document monitor 162, document processing tools 164, document log 166, and post office interface 168, as also shown in FIG. 1 and described above.

Computer system 300 utilizes well known virtual addressing mechanisms that allow the programs of computer system 300 to behave as if they only have access to a large, single storage entity instead of access to multiple, smaller storage entities such as main memory 320 and DASD device 355. Therefore, while data 321, operating system 322, scanned document folder(s) 150, and mailman application 160 are shown to reside in main memory 320, those skilled in the art will recognize that these items are not necessarily all completely contained in main memory 320 at the same time. It should also be noted that the term "memory" is used herein generically to refer to the entire virtual memory of computer system 300, and may include the virtual memory of other computer systems coupled to computer system 300. In addition, computer system 300 could include one or more virtual machines, with the mailman application 160 running on one of the virtual machines.

Processor 310 may be constructed from one or more microprocessors and/or integrated circuits. Processor 310 executes program instructions stored in main memory 320. Main memory 320 stores programs and data that processor 310 may access. When computer system 300 starts up, processor 310 initially executes the program instructions that make up operating system 322.

Although computer system 300 is shown to contain only a single processor and a single system bus, those skilled in the art will appreciate that a document processing system as disclosed and claimed herein may be practiced using a computer system that has multiple processors and/or multiple buses. In addition, the interfaces that are used preferably each include separate, fully programmed microprocessors that are used to off-load compute-intensive processing from processor 310. However, those skilled in the art will appreciate that these functions may be performed using I/O adapters as well.

Display interface 340 is used to directly connect one or more displays 365 to computer system 300. These displays 365, which may be non-intelligent (i.e., dumb) terminals or fully programmable workstations, are used to provide system administrators and users the ability to communicate with computer system 300. Note, however, that while display interface 340 is provided to support communication with one or more displays 365, computer system 300 does not necessarily require a display 365, because all needed interaction with users and other processes may occur via network interface 350.

Network interface 350 is used to connect computer system 300 to other computer systems or workstations 375 via network 370. Network 370 is one suitable representation of office network 130 in FIG. 1. Network interface 350 broadly represents any suitable way to interconnect electronic devices, regardless of whether the network 370 comprises present-day analog and/or digital techniques or via some networking mechanism of the future. Network interface 350 preferably includes a combination of hardware and software that allow communicating on the network 370. Software in the network interface 350 preferably includes a communication manager that manages communication with other computer systems or other network devices 375 via network 370 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 350.

As will be appreciated by one skilled in the art, aspects of the disclosed document processing system may be embodied as a system, method or computer program product. Accordingly, aspects of the document processing system may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the document processing system may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the document processing system may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the document processing system are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
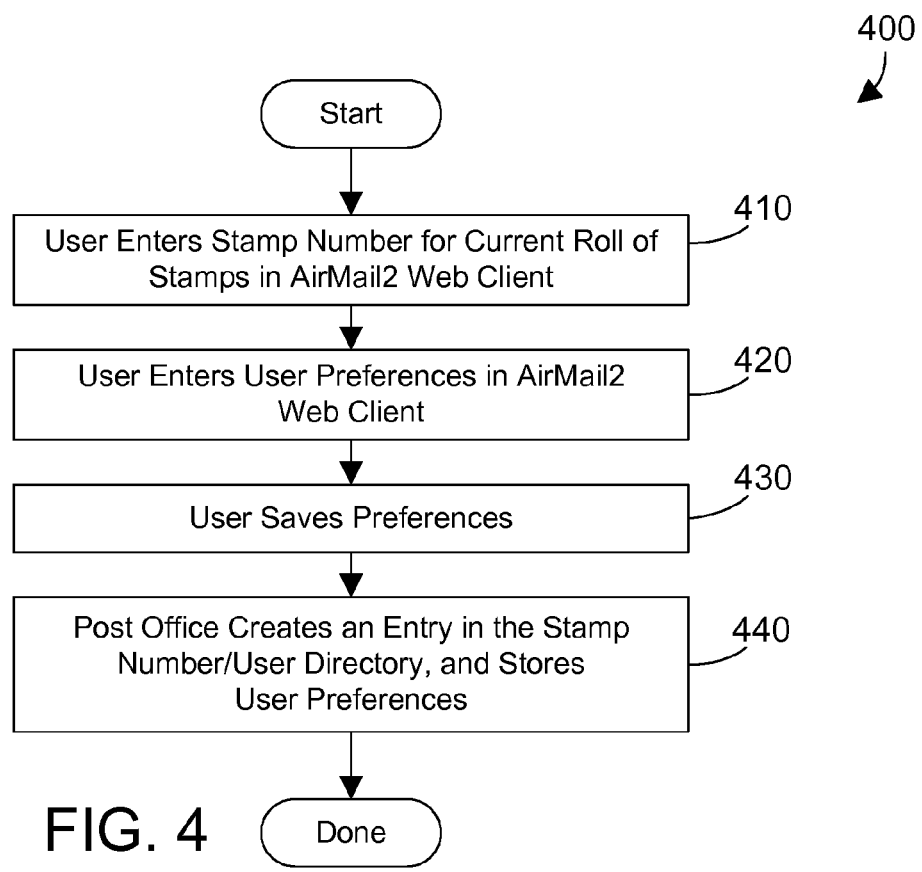
FIG. 4 is a flow diagram of a method for a user to interact with the post office.

Referring to FIG. 4, a method 400 shows the steps to initially configure the document processing system 100 for use by a user. In the most preferred implementation, the user has a browser-based interface from the user's workstation to the post office 182. This browser-based interface is referred to herein as the AirMail2 Web Client, as shown in FIG. 1. The user enters the stamp number for the current roll of stamps in the AirMail2 Web Client (step 410). In the most preferred implementation, the user gets a roll 510 of stamps shown in FIG. 5. This could be done, for example, by the user picking a roll of stamps from a box of rolls of stamps from a supply cabinet. The roll preferably includes multiple stamps 520A, 520B, 520C, etc. that each has the same stamp number, preferably in both barcode form 528 and in alphanumeric form 530. However, other types of identifiers could also be used, including graphical identifiers, etc. For the specific example in FIG. 5, the stamp number is ABC123, and the roll of stamps preferably includes 100 stamps that all have the same stamp number. In the most preferred implementation, the size of the stamp is comparable to the size of a United States postage stamp, allowing currently-available stamp dispensers to be used with the roll of stamps. The user then enters user preferences in the AirMail2 Web Client (step 420). The user then saves the user preferences (step 430). The user preferences are stored in the database 220 of the post office 182. User preferences may include a default preference and a next document preference (shown in FIG. 2), and may also include a next N documents preference (shown as a button in FIGS. 10-13). The post office then creates an entry in the stamp number/user directory 230 that correlates the user to that stamp number, and stores the user preferences in the database 220. At this point the system is configured for use by the user.

Figure 6:
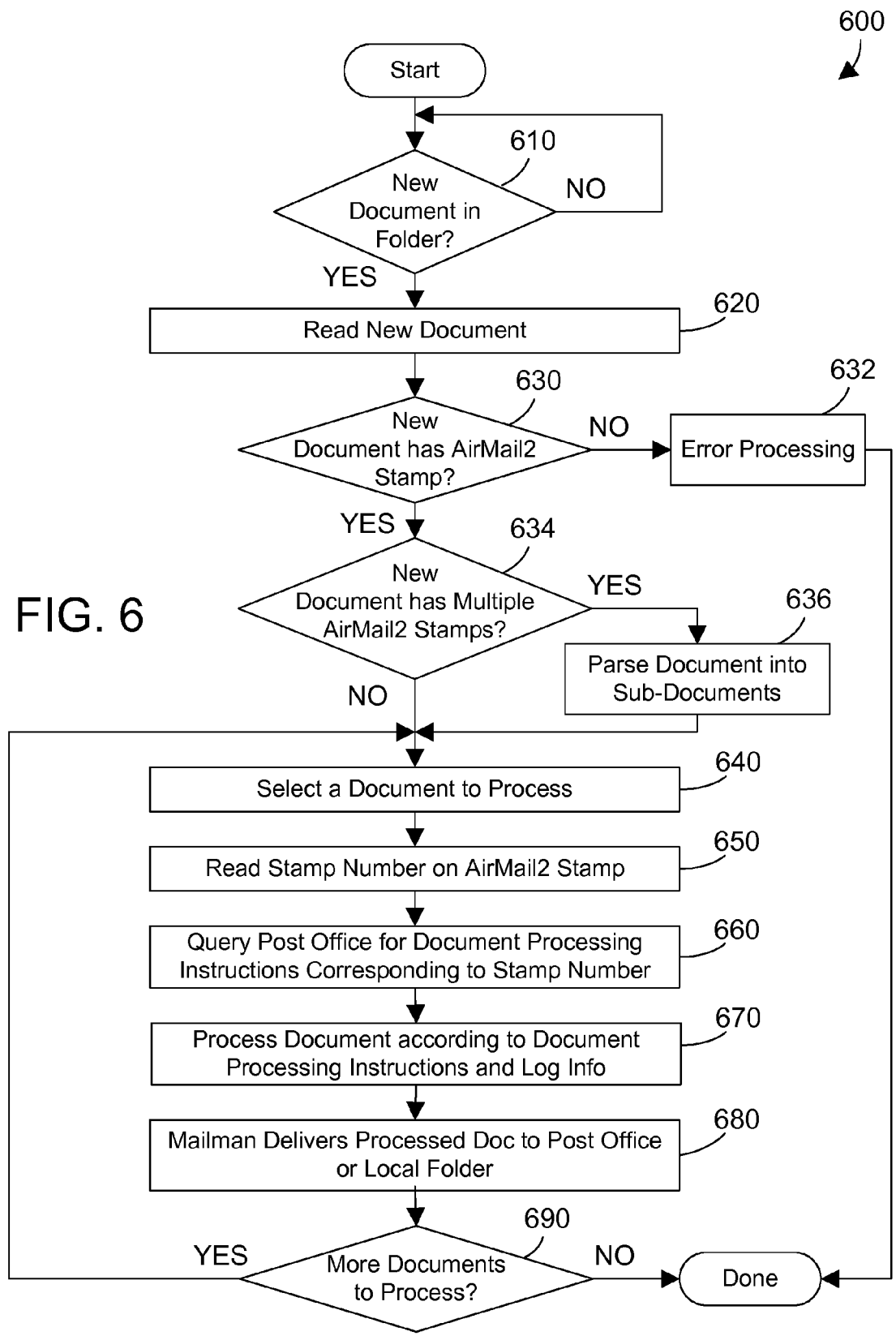
FIG. 6 is a flow diagram of a method performed by the Mailman application in FIGS. 1 and 3.

Referring to FIG. 6, a method 600 is preferably performed by the mailman application 160 in FIGS. 1 and 3. When the mailman application is initially installed on the office server, we assume the mailman application is setup by an administrator to monitor one or more scanned document folders 150 for new scanned documents. If a new document is not in the watched folder(s) (step 610=NO), method 600 waits until a new scanned document arrives (step 610=YES). The document is read (step 620) to determine if it has an AirMail2 stamp. Because barcodes are difficult to read accurately when the barcode is skewed, and because the AirMail2 stamps are manually placed on a document by the user, the reading of the document in step 620 preferably includes validation to make sure the stamp is read correctly. For example, the barcode could be read twice to assure the same value is read both times. In the alternative, the barcode 528 could be read and the alphanumeric identifier 530 could also be read using optical character recognition, and the two could be compared. The document processing system disclosed and claimed herein includes any suitable method for verifying the read of the stamp number is correct.

If the new document does not have an AirMail2 stamp (step 630=NO), error processing is performed (step 632). Error processing 632 may be any suitable function that may be performed when a newly scanned document does not have an AirMail2 stamp. For example, error processing 632 may including sending the new scanned document to the post office application 182, where the new scanned document is stored in the document repository 270. In addition, an error message may be sent to a system administrator informing the system administrator that a document that was intended for the mailman application did not have an AirMail2 stamp. Of course, any other suitable function may be performed as part of error processing in step 632. After the error processing in step 632, method 600 is done.

If the new document has an AirMail2 stamp (step 630=YES), the document is checked for multiple AirMail2 stamps (step 634). If multiple AirMail2 stamps are present (step 634=YES), the document is parsed into sub-documents (step 636). Let's assume a user wants to scan four different documents, where the first has three pages, the second has one page, the third has four pages, and the fourth has ten pages. The user may simply attach an AirMail2 stamp on the first page of each of these documents, then stack all four documents together and scan the documents to a scanned document folder. Step 634 in FIG. 6 will detect the four AirMail2 stamps, and will parse the document into four sub-documents delineated by the AirMail2 stamps. Step 636 assumes a page without a stamp is part of the document defined by the last stamp seen. Thus, two consecutive pages that each have a stamp means the first is a one page document.

In step 640, a document is selected to process (step 640). If there was only one AirMail2 stamp (step 634=NO), the new document is selected for processing in step 640. If there were multiple AirMail2 stamps (step 634=YES), one of the sub-documents defined in step 636 will be selected in step 640 for processing. The stamp number on the AirMail2 stamp is read (step 650). As discussed above, the barcode and alphanumeric representations of the stamp number may both be read and compared. The post office is then queried for document processing instructions corresponding to the stamp number (step 660). In response, the post office determines from the stamp number/user directory the user corresponding to the stamp number, then determines the user preferences for that user. The post office then generates document processing instructions from the user preferences, and returns the document processing instructions to the mailman application. The mailman application then processes the scanned document according to document processing instructions and logs the scanned document in the document log 166 in FIGS. 1 and 3 (step 670). The mailman then performs any required processing indicated in the document processing instructions, and delivers the processed document to the post office or a local folder (step 680). In the most preferred implementation, the data in the document log 166 is sent by the mailman application with the stamp number to the post office in step 680, thereby allowing the post office 182 to contain the master log 266 for all documents handled by the post office. If there are no more documents to process (step 690=NO), method 600 is done. If there are more documents to process (step 690=YES), method 600 loops back to step 640, selects the next document for processing (step 640), and continues until there are no more documents to process (step 690=NO).

Figure 8:
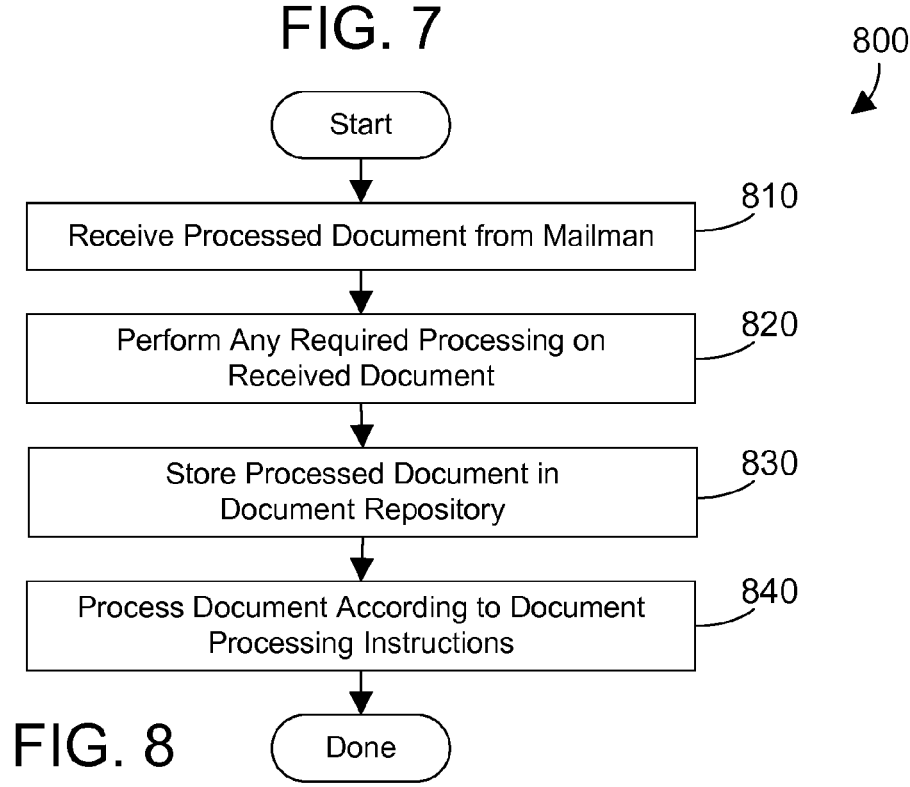
FIG. 8 is a flow diagram of a second method performed by the post office.

Method 700 and 800 in FIGS. 7 and 8, respectively, represent methods that are preferably performed by the post office 182 shown in FIGS. 1 and 2. Method 700 begins when a mailman passes a stamp number to the post office to determine document processing instructions for the document (step 710) (e.g., in step 660 in FIG. 6). The stamp number/user directory is queried to determine the user corresponding to the stamp number (step 720). The user preferences for that user are read to determine document processing instructions for the scanned document (step 730). In the specific implementation shown in FIG. 7, the post office reads the user preferences and generates document processing instructions from the user preferences. In the alternative, however, the user preferences may be document processing instructions, which eliminates the step of generating document processing instructions from user preferences. The term "document processing instructions" as used in the disclosure and claims includes data specified by a user or information generated from data entered by a user. A user may specify document processing instructions within the scope of the disclosure and claims herein by either entering user preferences that are used to generate the document processing instructions, or entering document processing instructions directly. The document processing instructions are returned to the mailman application (step 740). The document information is then logged (step 750) to the log 266 in FIG. 2.

Method 800 in FIG. 8 is preferably performed by the post office when the scanned document is delivered to the post office by the mailman in step 680 in FIG. 6. The processed document is received from the mailman (step 810). Any additional processing that may be needed may then be performed (step 820). Additional processing may be any suitable processing, such as performing optical character recognition on a .pdf document to create a .pdf+text document, compressing the document, etc. The processed document is stored in the document repository (step 830). The processed document is also delivered according to the document processing instructions (step 840). Method 800 is then done.

Referring to FIG. 9, sample document processing instructions 900 may include instructions relating to the format for the document, document processing options, and destination for the document. The format for the document may include file type. Examples of known file types for scanned documents include plain text, word processing format (e.g., Microsoft Word), portable document format (PDF), PDF+text, TIFF, .bmp, .jpg, .gif, etc. Of course, any suitable file type may be used within the scope of the disclosure and claims herein. The format for the document may also include compressing the document; converting the document to black and white; adding encryption; adding security information (such as a user name and/or password); and size of the document. Document processing options include: redact stamp on the delivered document; e-mail copy to the sender; send the file as a link or an attachment; convert the file to a different format; apply the default; apply to the next document only; apply to the next N documents; apply for documents scanned to a specified date; apply to documents for the rest of stamps on the roll (meaning the rest of stamps that have the same stamp number); and put the document e-mailed to others in a format where it can be put in the Sent Items folder of the user's e-mail program (e.g., Outlook, Gmail, etc.). Note the "from" e-mail address in an e-mail sent by the post office to a different user will be a sending user's e-mail address, thereby disguising the fact the e-mail came from the post office.

Destination for the document may include the user's e-mail, a network location, and a different e-mail. The sample document processing instructions in FIG. 9 are shown by way of example. One skilled in the art will realize that other document processing instructions are within the scope of the disclosure and claims herein. In the most preferred implementation, we assume the document processing instructions will always indicate to redact the stamp on the delivered document. This processing is preferably performed by the document processing tools 164 in the mailman application 160, as shown at step 670 in FIG. 6. Because the mailman application includes document processing tools 164 and the post office 182 also includes document processing tools 276, document processing tasks may be performed by either, or any suitable combination of the two. For example, the mailman could be configured to always do compression when compression is specified in the document processing instructions, while the delivery of the document to the user's e-mail, to a different e-mail, or to a network location would be preferably performed by the post office 182. The disclosure and claims herein extend to any suitable processing of documents that may be performed by the mailman application 160 and/or the post office 182.

One of the sample document processing options in FIG. 9 that is part of the sample document processing instructions includes putting the document e-mailed to others in the user's Sent Items folder of their e-mail client. This function is significant because the actual e-mailing of the document is performed by the post office, not the user's e-mail client (such as Outlook or Gmail). By putting an e-mail that was sent by the post office in the user's Sent Items folder, the document processing system makes it appear the e-mail was sent from the user's e-mail client, when it fact it was not. This provides simplicity for the user by preventing the user from having to consult a different log of e-mails sent via the post office. By integrating the e-mails sent to others into the Sent Items folder, the user now has all the items he or she sends, whether by the e-mail client or by the post office, in a single place.

There are four specific functions that are supported by the document processing system disclosed and claimed herein: e-mail the document to the user; store the document to a network location; e-mail the document to someone else; and convert the document to a different format. Because the document processing system is commercially known as AirMail2, the functions recited above are referred to herein as: AirMail2Me, AirMail2Folder, AirMail2You, and AirMail2Convert, respectively. An example will now be given to illustrate how each of these functions are configured by a user.

Figure 10:
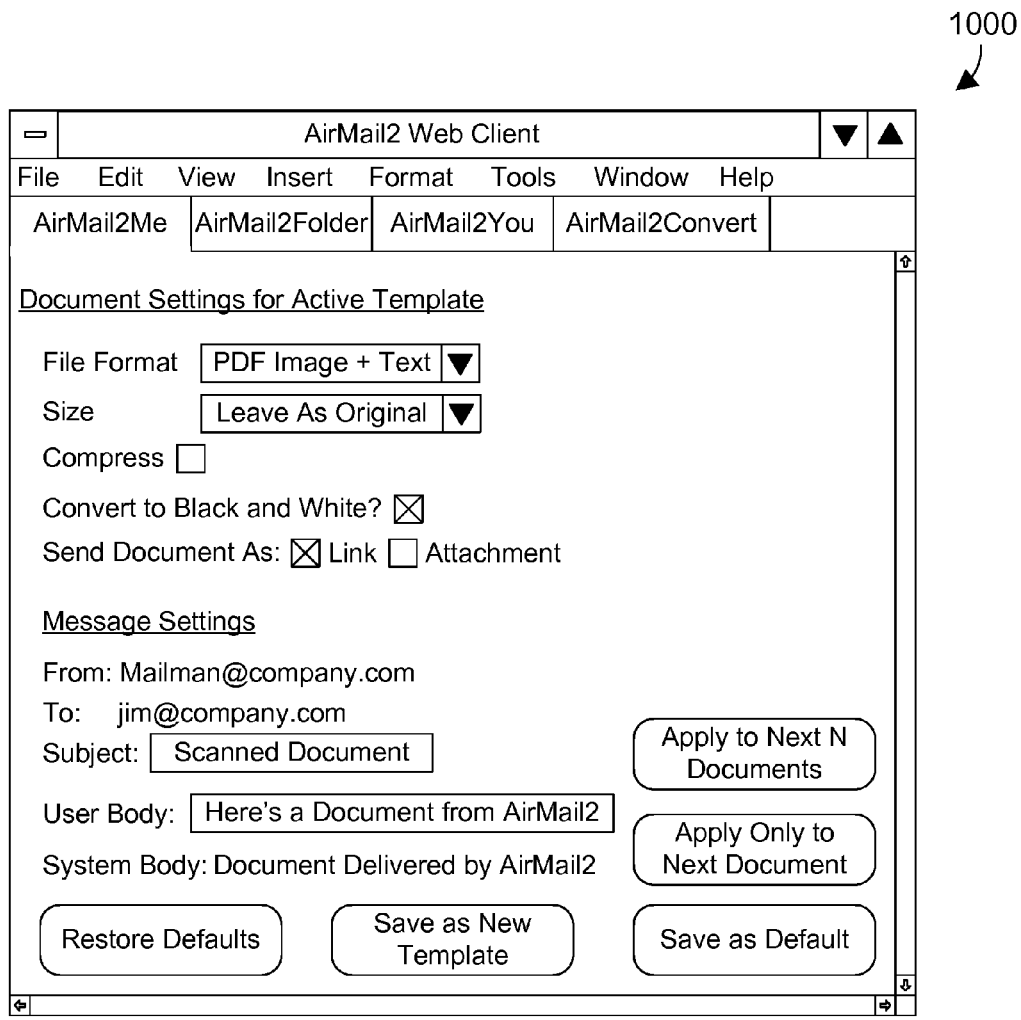
FIG. 10 shows a sample user interface for setting user preferences for an AirMail2Me function.

FIG. 10 shows an AirMail2 web client (e.g., 112A in FIG. 1) that is invoked by the user on the user's workstation (e.g., 110A in FIG. 1). Because the AirMail2 Web client is web-based, it is displayed in a standard browser interface. For the display 1000 shown in FIG. 10, the AirMail2Me tab is selected by the user, which allows the user to specify various parameters that will apply to the AirMail2Me function performed by the document processing system to e-mail a document to be scanned to the user. The specific example in FIG. 10 shows the user has selected PDF Image+Text as the file format, which means the PDF file will have text that has been generated by Optical Character Recognition (OCR) in addition to an image file. The user has selected "Leave as Original" for the size of the document. The user has also selected the box for Convert to Black and White, and has selected the box that specifies to send the document as a link in the e-mail instead of sending the document as an attachment. In the Message Settings, the From and To boxes are preferably filled in from information received from the post office according to information the user entered when specifying user preferences. For the example in FIG. 10, the From e-mail address is Mailman@company.com, while the To e-mail address is the e-mail address of the user, which we assume is jim@company.com. The user may enter text for the Subject line of the e-mail, and may enter text for the User Body of the e-mail. We assume the system will additionally add "Document Delivered by AirMail2" in the body of the e-mail. Note the user has several options once the information in FIG. 10 has been entered as shown. The user may select the "Restore Defaults" button to change all the information entered by the user into default values previously specified by the user. The user may also select the "Save as New Template" button, which causes the information the user entered into the AirMail2 Web Client to be saved as a template for future use. The "Save as Default" button causes the data to be saved as the default settings for the AirMail2Me function. The "Apply Only to Next Document" button causes the information to be used for only the next document that is scanned by the user. The "Apply to Next N Documents" button will cause a drop-down list to appear that allows the user to specify for how many documents the information will be used. For example, let's assume the user has five different invoices to scan and e-mail to himself or herself. The user places an AirMail2 stamp on each of the five invoices, enters the information shown in FIG. 10, clicks on the "Apply to Next N Documents" button, and selects the number 5 in the drop-down list that is displayed. The user may then scan all five documents at once. Referring to FIG. 6, in response, the mailman application will detect there are multiple AirMail2 stamps (step 634=YES) and will parse the scanned document into the five sub-documents (step 636). Each sub-document will then be processed in steps 640-690. Because the user specified to use the settings shown in FIG. 10 for the next five documents, the five sub-documents will be e-mailed to the user using the settings shown in FIG. 10. Once the five sub-documents are processed, the default settings would be used for the sixth document.

Figure 11:
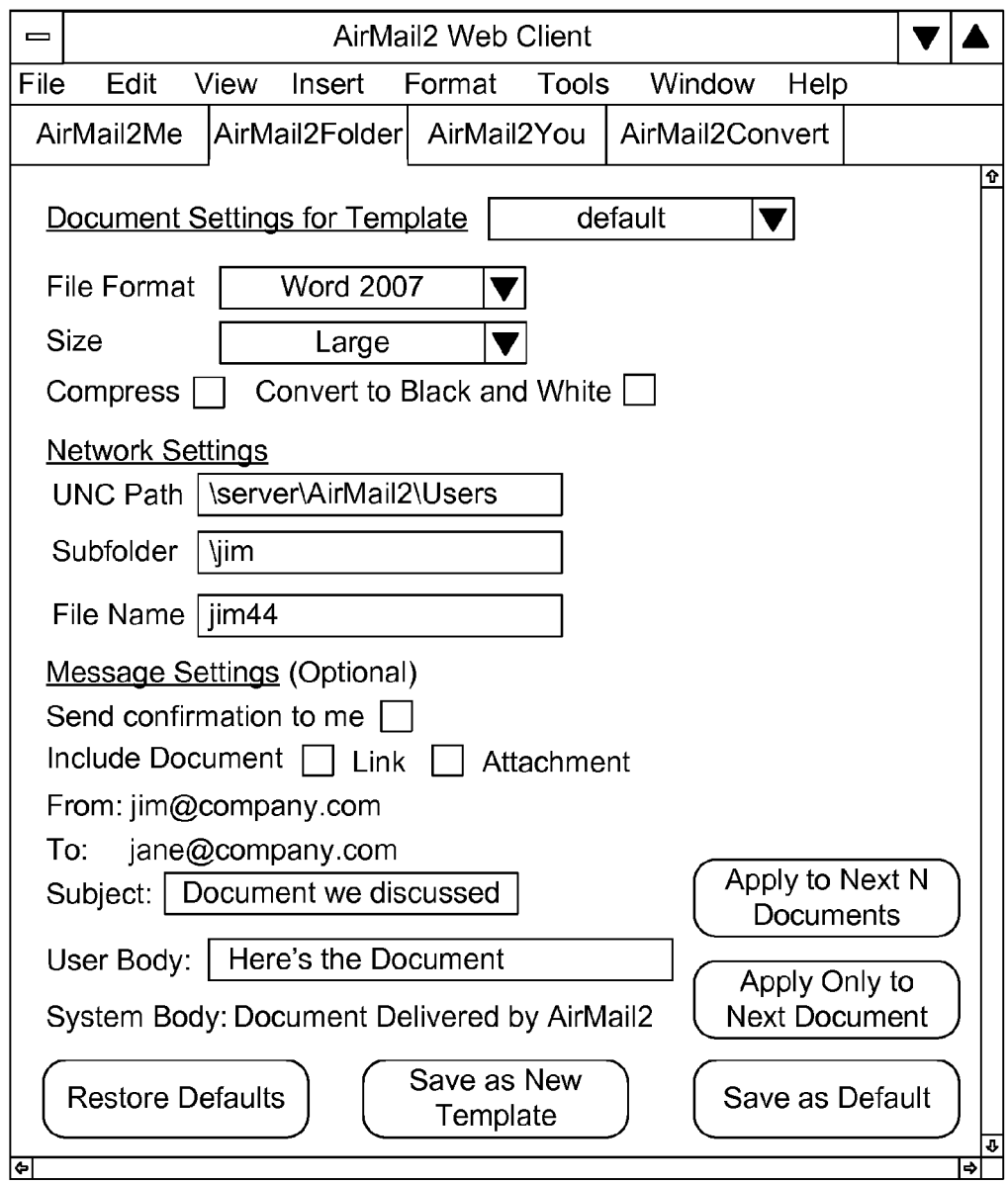
FIG. 11 shows a sample user interface for setting user preferences for an AirMail2Folder function.

FIG. 11 shows a display 1100 of the AirMail2 Web Client with the AirMail2Folder tab selected. This tab is selected when the user wants to scan a document, then store the document at a specified network location. The document settings for the template are set to "default", which is a default template provided by the system administrator. The file format for the document is Word 2007, and the size is Large. The user may enter network settings, including the uniform naming convention (UNC) path for the directory, a subfolder name, and a file name for the document to be scanned. For the specific example in FIG. 11, the document, once scanned, will be stored to the following network location: \server\AirMail2\Users\jim\jim44.docx. Note the file extension .docx is determined from the file format setting of Word 2007. The user may optionally select various message settings, including whether or not to send confirmation to the sender to confirm the file was stored as requested, and whether the document should also be e-mailed as a link or attachment. Note the From e-mail and To e-mail are preferably filled in by the post office as described above for FIG. 10. The Subject, User Body and System Body are similar to the fields described above for FIG. 11. Once the information shown in 1100 in FIG. 11 has been input by the user, the user may click on the "Restore Defaults" button, the "Save as New Template" button, the "Save as Default" button, the "Apply to Next Document" button, or the "Apply to Next N Documents" button. The functions of these buttons are similar to the functions of the buttons described in detail above with respect to FIG. 10.

Figure 12:
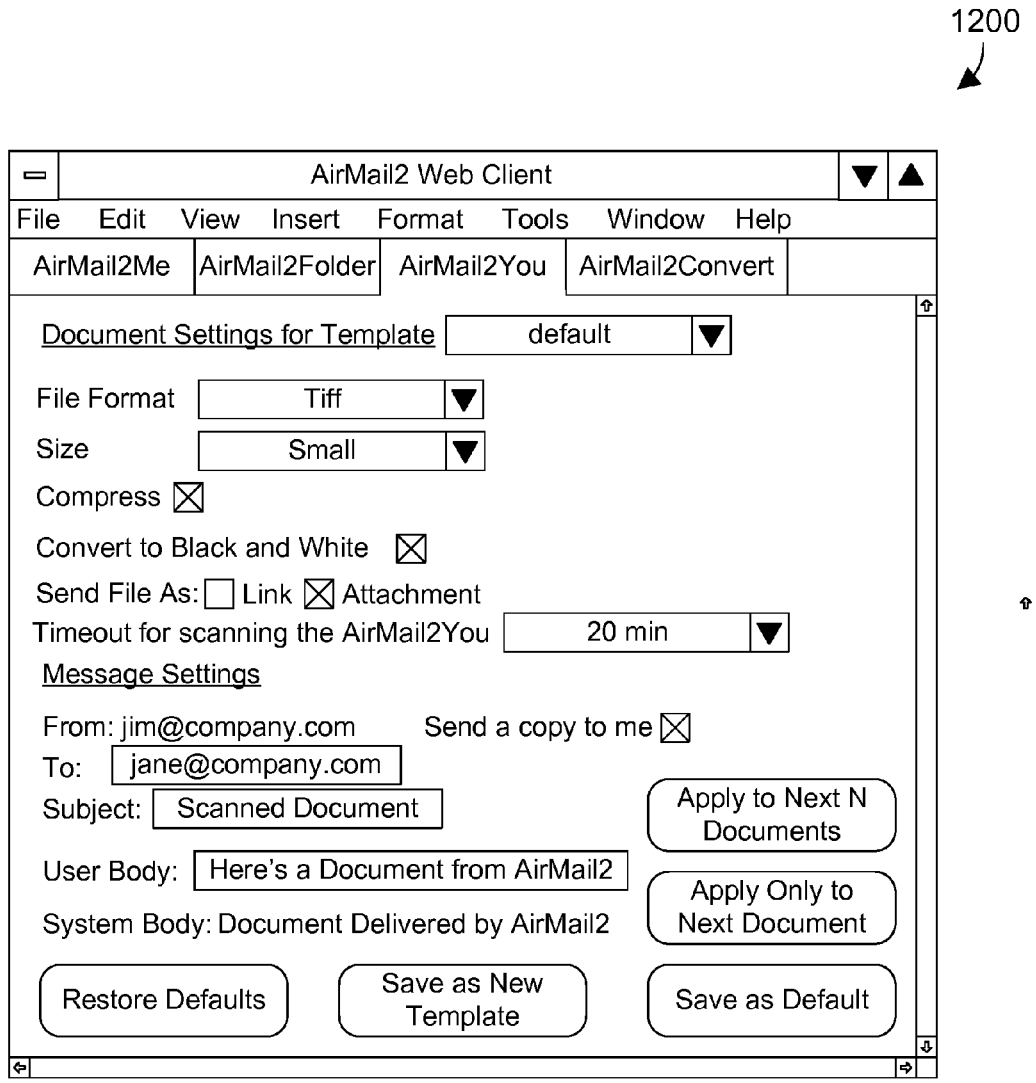
FIG. 12 shows a sample user interface for setting user preferences for an AirMail2You function.

FIG. 12 shows a display 1200 of the AirMail2 Web Client with the AirMail2You tab selected. As for the other examples, the user may enter some of the information, while the system preferably enters other information. The user specifies a file format of Tiff, with a size of Small. The user also selects to compress the document, to convert the document to black and white, and to send the document as an attachment to the e-mail. The user may also select a timeout value from a drop-down list that allows the settings for the AirMail2You function to expire once the timeout value is met. For the specific example in FIG. 12, the timeout value is 20 minutes, which means after 20 minutes these settings will no longer apply. The message settings include a From address filled in by the system, with the To address, subject, and User Body specified by the user. Note the user may also select to send a copy of the e-mail to himself or herself. Once the information shown at 1200 in FIG. 12 has been entered, the user may select one of the five buttons, which will have the effect described above with respect to FIG. 10

FIG. 13 shows a display 1300 of the AirMail2 Web Client with the AirMail2Convert tab selected. AirMail2Convert is used to convert a document from one format to a different format. For example, let's assume a user initially scans a pleading to be filed with a court, and specifies PDF+Text as the file type. Let's further assume that local court rules required all papers filed with the court to be in PDF image format, not PDF+Text. The user may use AirMail2Convert to convert the PDF+Text file to a corresponding PDF image file. The user specifies the file to convert, and further specifies the file format and size of the desired document after conversion. The user may also specify to compress, convert to black and white, and send the file as a link or an attachment. The message settings are optional for AirMail2Convert, and allow the user to send a copy of the file to his or her e-mail. Note the buttons in FIG. 13 provide similar functions as the similar buttons in FIGS. 10-12, which are described in detail above with respect to FIG. 10. In another example, a document native to an application, such as a Microsoft Word document, may be converted to any supported file format using AirMail2Convert.

The information entered by a user in the examples shown in FIGS. 10-13 are part of the user preferences 240 shown in FIG. 2, and are used to generate the appropriate document processing instructions 258 for a particular document. While specific fields are shown in FIGS. 10-13, these are shown by way of example. One skilled in the art will realize the user could enter any suitable information for processing a document using the document processing system. Note also the user may specify different default values for the four different functions discussed above. The user preferences may thus include multiple default values, multiple next document preferences, and multiple next N document preferences. If the user preferences include multiple sets of default values, the user may preferably select one of these as the overall default that will be performed if the user has not entered any new information.

The document processing system could include document processing instructions that are specified for a particular roll of stamps, where the user has multiple rolls of stamps assigned. The user could thus define the default behavior for a first roll of stamps to be AirMail2Me, the default for a second roll of stamps could be AirMail2Folder, the default behavior for a third roll of stamps could be AirMail2You, and the default behavior for a fourth roll of stamps could be AirMail2Convert. The user could then put a stamp on a document according to the desired default behavior for that stamp, allowing the user to change default behaviors without accessing the AirMail2 web client.

Figure 14:
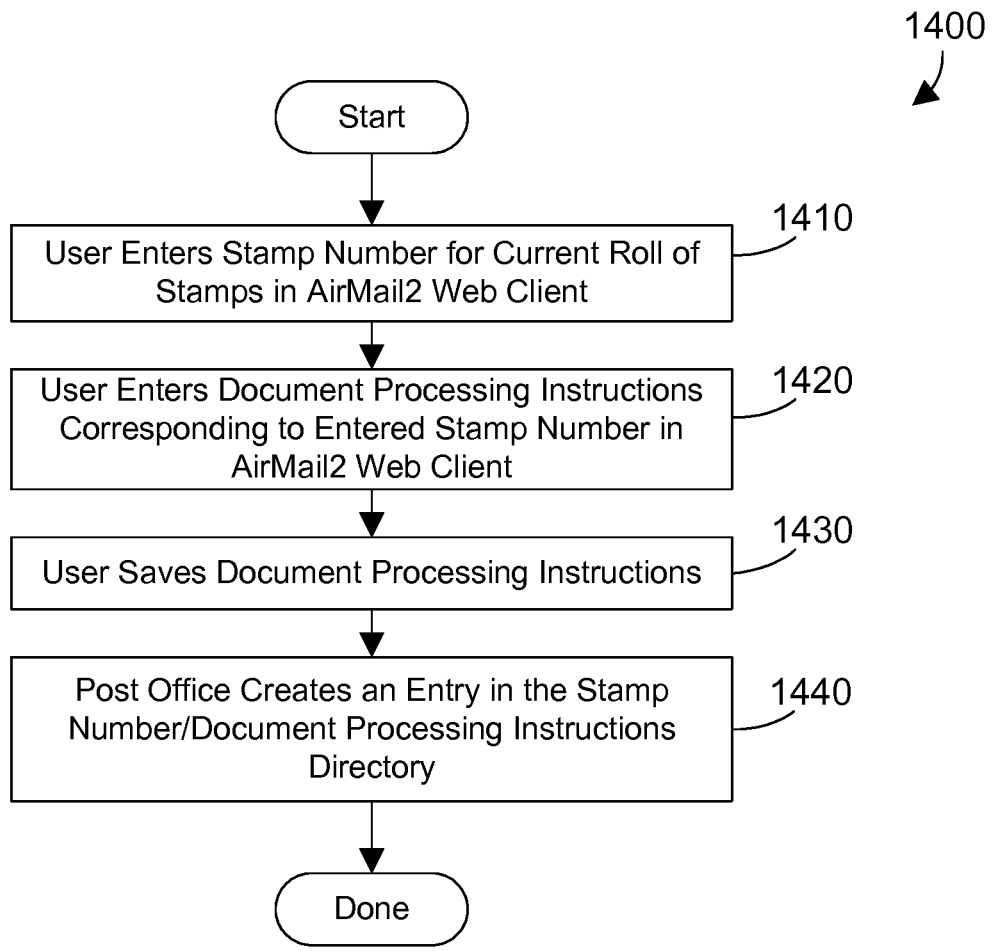
FIG. 14 is a flow diagram that replaces method 400 in FIG. 4 in one specific implementation.

One specific implementation that does not deal with user preferences is shown in FIGS. 14-16. Referring to FIG. 14, method 1400 shows the steps for not using user preferences shown and discussed in FIGS. 2, 4 and 7. Instead of generating user preferences that are used to generate document processing instructions, the user could instead enter the document processing instructions directly, and correlate the document processing instructions directly to a stamp number. This functionality would allow the user to define four different default behaviors for the four different rolls of stamps discussed in the preceding paragraph. First, the user enters the stamp number for a current roll of stamps in the AirMail2 web client (step 1410). The user then enters corresponding document processing instructions for the stamp number (step 1420). The user then selects to save the document processing instructions (step 1430). In response, the post office creates an entry in a stamp number/document processing instructions directory (step 1440). The stamp number/document processing instructions directory 230A is shown in FIG. 15, and would replace the stamp number/user directory 230, the user preferences 240 and the document processing instructions 258 in FIG. 2. In this implementation, instead of correlating a stamp number to a user, and reading user preferences to determine document processing instructions for the stamp number, the user directly enters document processing instructions for the stamp number. As a result, document processing instructions are defined for stamp numbers, not for users.

Referring to FIG. 16, a method 1600 is a suitable method for this specific implementation that would replace method 700 in FIG. 7, and which describes how the post office processes a stamp number received from the mailman. First, the stamp number is received from the mailman (step 1610). The stamp number/document processing instructions directory is then queried to find the entry corresponding to the stamp number received from the mailman (step 1620). The corresponding document processing instructions are returned to the mailman (step 1630), and the document information is logged (step 1640). Assigning document processing instructions directly to stamp numbers has certain advantages. For example, a user could have multiple rolls of stamps that each have different default document processing instructions defined, thereby allowing the user to specify how to process a document according to the user's decision of what stamp to put on the document before scanning While the examples herein discuss assigning a single stamp number to corresponding document processing instructions, there could be many stamp numbers assigned to the same corresponding document processing instructions. For example, a range of stamp numbers could be defined, and a single set of document processing instructions could then be defined that will be applied to any stamp number in that range. In addition, stamp numbers are preferably globally unique, thereby allowing the post office to correlate unique stamp numbers to corresponding users or document processing instructions.

The specific implementation assumes a digital copier/scanner scans a document to a defined network folder, and the mailman monitors one or more network folders for new scanned images. However, there are many other ways to transfer an image from a digital copier/scanner to the mailman. For example, software such as File Transfer Protocol (FTP) or other communication software could be used to transfer an image to the mailman. There are many different ways to transfer a scanned image from a digital copier/scanner to the mailman, and the disclosure and claims herein expressly extend to any suitable method for transferring the scanned image to the mailman.

The specific examples herein discuss the use of adhesive stamps. However, a stamp need not be a small sticker. A stamp could be printed on a cover sheet, and the document processing system would know to ignore the cover sheet and apply the document processing instructions that correspond to the stamp number on the cover sheet. One advantage of using a cover sheet is no distribution of stamps is required to initiate use of the system.

The document processing system disclosed and claimed herein provides many beneficial features. For one thing, many companies are very wary about purchasing software tools that take significant network or computer system resources and will require significant time to install and maintain. In the document processing system disclosed herein, the only software that has to be installed and configured on the office server is the mailman application, which is very lightweight, easy to install, and does not require significant IT resources to maintain. Most of the horsepower in the document processing system is off-site at the post office, thereby freeing a company from the need of running such an application on the company's network, and distributing the load of image processing. The post office may be easily accessed and configured by a user via a simple browser interface, as shown in the specific examples in FIGS. 10-13. The combination of a mailman application running on the company's network with a post office running off-site provides a powerful combination that allows great ease and flexibility in processing documents. While the combination of the mailman application running on the company's network and a post office running off-site is preferred, one skilled in the art will recognize the post office could be implemented on the company's network as well, providing a local-only solution.

While one specific implementation is to have the mailman application running on the company's network with a post office running off-site, another specific implementation that is within the scope of the disclosure and claims herein has both the mailman application and the post office running off-site. In this configuration, a digital copier/scanner could be configured to e-mail all AirMail2 documents to a specified e-mail address instead of storing the documents to a local network folder. The function of the mailman application and post office could then be the same as described in detail above once the mailman receives the document. In this configuration, the mailman application 160 shown in FIG. 1 would reside in the web server 180 that hosts the post office 182 instead of residing in the office server 140. Thus, the disclosure and claims expressly extend to a local-only solution where both the mailman application 160 and post office 182 reside on a single computer system (such as office server 140 shown in FIG. 1), to a mixed local/remote system as shown in FIG. 1, and to a remote-only solution where both the mailman application 160 and post office 182 reside on a remote computer system (such as web server 180 shown in FIG. 1). While the claims recite a first server and a second server, with the local-only and remote-only configurations described above, the first server and second server are the same computer system.

Another advantage of the document processing system disclosed herein is the ease of use for the user. Once the system is installed and configured, the user can simply select an AirMail2 function on a copier's keypad, scan the document, and the rest is automatic. This provides a user interface that is consistent across many different models and makes of digital copiers, significantly improving the ease of use.

Note the document processing system is designed to bring to mind in some respects the process for delivering a document via the United State Postal Service. The stamps used in the AirMail2 system are preferably the same size and shape as US postage stamps, allowing known postage stamp dispensers to be used for the AirMail2 stamps. Let's assume a user has selected AirMail2Me as the default behavior, and has specified suitable default values for AirMail2Me as shown in the example in FIG. 10. The process for having a document e-mailed to the user is very simple. First, the user takes a stamp from his or her roll of stamps, and puts the stamp on the document. Next, the user goes to a digital copier and selects an AirMail2 function on the copier, which causes the copier to scan the document and put the scanned document into a network folder that is monitored by the mailman application. When the mailman application detects the new scanned document in the monitored network folder, the document is read by the mailman, the stamp number is read by the mailman, and the mailman sends the stamp number to the post office for document processing instructions. The post office finds the document processing instructions that correspond to the stamp number, and returns the document processing instructions to the mailman. We assume the document processing instructions include the redaction of the stamp, which is preferably done by the mailman application. The mailman application then sends the document with the redacted stamp to the post office for delivery. The post office reads the document processing instructions, and e-mails the document to the user according to the document processing instructions. So from the user's perspective, once the AirMail2 system is installed and configured, and the user has entered the stamp number on his or her roll of stamps and defined AirMail2Me as a default behavior with suitable default information for the AirMail2Me function, all the user has to do to have a document e-mailed to the user is: 1) place a stamp on the document to be scanned; and 2) scan the document using a digital copier by invoking an AirMail2 function on the copier. That's it! The document appears as either an attachment or link in an e-mail in the user's in-box in the user's e-mail client. And this extremely powerful document processing can be performed with a minimum of software running on the office server. The result is a very powerful document processing system that is easy to install, easy to configure, and very easy to use.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A networked computer system comprising:
   a user workstation that includes an interface for a user to input a first stamp number corresponding to the user and to specify document processing instructions corresponding to the first stamp number, the first stamp number and document processing instructions corresponding to the first stamp number being stored in a post office;
   a first server coupled via network to the user workstation, the first server including a mailman application that receives a new scanned document, processes the new scanned document to determine a second stamp number on a stamp on the new scanned document, where the second stamp number comprises an identification number on the stamp, wherein the identification number on the stamp is the same for each stamp in a roll of stamps assigned to the user, the mailman application including an interface for communicating with a post office application in the post office; and
   a second server coupled via network to the user workstation, the second server including the post office, the post office application receiving from the mailman application the second stamp number corresponding to the new scanned document, determining the second stamp number matches the first stamp number entered by the user, determining from the user input the document processing instructions corresponding to the first stamp number, and returning to the mailman application the document processing instructions corresponding to the first stamp number that define how to process the new scanned document.

2. The networked computer system of claim 1 wherein the post office application is a web-based application, and the interface for communicating with the post office application comprises information for accessing the post office application.

3. The networked computer system of claim 1 wherein the mail man application processes the new scanned document according to the document processing instructions corresponding to the first stamp number.

4. The networked computer system of claim 1 wherein the document processing instructions specify to e-mail the new scanned document to the user.

5. The networked computer system of claim 1 wherein the document processing instructions specify to e-mail the new scanned document to a different user.

6. The networked computer system of claim 1 wherein the document processing instructions specify to store the new scanned document in a network location.

7. The networked computer system of claim 1 wherein the document processing instructions specify to process the new scanned document to generate the new scanned document in a different format.

8. The networked computer system of claim 1 wherein the document processing instructions specify to e-mail a link to the new scanned document stored in the post office.

9. The networked computer system of claim 1 wherein the first server and the second server are the same computer system.

10. A computer-implemented method for processing documents in a networked computer system, the method comprising the steps of:
    providing at least one processor;
    providing a memory coupled to the at least one processor, the at least one processor performing the steps of:
    (A) a user inputting a first stamp number corresponding to the user and specifying document processing instructions corresponding to the first stamp number, the first stamp number and corresponding document processing instructions being stored in a post office application;
    (B) receiving a new scanned document;
    (C) processing the new scanned document to determine a second stamp number on a stamp on the new scanned document, where the second stamp number comprises an identification number on the stamp, wherein the identification number on the stamp is the same for each stamp in a roll of stamps assigned to the user;
    (D) sending the second stamp number to the post office application;
    (E) the post office application receiving the second stamp number corresponding to the new scanned document, and determining the second stamp number matches the first stamp number entered by the user;
    (F) determining from the user input the document processing instructions corresponding to the first stamp number; and
    (G) returning the document processing instructions corresponding to the first stamp number that define how to process the new scanned document.

11. The method of claim 10 wherein the post office application is a web-based application.

12. The method of claim 10 further comprising the step of processing the new scanned document according to the document processing instructions corresponding to the first stamp number.

13. The method of claim 10 wherein the document processing instructions specify to e-mail the new scanned document to the user.

14. The method of claim 10 wherein the document processing instructions specify to e-mail the new scanned document to a different user.

15. The method of claim 10 wherein the document processing instructions specify to store the new scanned document in a network location.

16. The method of claim 10 wherein the document processing instructions specify to process the new scanned document to generate the new scanned document in a different format.

17. The method of claim 10 wherein the document processing instructions specify to e-mail a link to the new scanned document stored in the post office.

18. A computer-implemented method for processing documents in a networked computer system, the method comprising the steps of:
  providing at least one processor;
  providing a memory coupled to the at least one processor, the at least one processor performing the steps of:
  (A) a user using a web browser to access a web-based post office application in the networked computer system, the user entering in the web browser a first stamp number corresponding to a number on all stamps in a roll of stamps and specifying corresponding document processing instructions for the first stamp number;
  (B) in response to step (A), the web-based post office application creating an entry in a database that correlates the first stamp number to the corresponding document processing instructions, the document processing instructions comprising a default preference and a next document preference;
  (C) a mailman application in the networked computer system that monitors at least one network location for scanned documents;
  (D) when a new scanned document is in the at least one network location, the mailman application processes the new scanned document to read a second stamp number on the new scanned document;
  (E) the mailman application sending the second stamp number to the web-based post office application to determine document processing instructions for the new scanned document from the web-based post office application;
  (F) the web-based post office application reading the second stamp number and determining the second stamp number and the first stamp number are the same;
  (G) the web-based post office application reading the document processing instructions corresponding to the first stamp number;
  (H) the web-based post office application returning the document processing instructions corresponding to the first stamp number to the mailman application as document processing instructions defining how to process the new scanned document;
  (I) the mailman application processing the new scanned document according to the document processing instructions received from the web-based post office application, the processing comprising redacting the stamp in the new scanned document to generate a redacted new scanned document;
  (J) the mailman application storing the redacted new scanned document to the web-based post office application;
  (K) the web-based post office application storing the redacted new scanned document to a document repository in a database; and
  (L) the web-based post office application delivering the redacted new scanned document according to the document processing instructions.

19. The method of claim 18 wherein step (L) comprises the step of the web-based post office application e-mailing the new scanned document to the user.

20. The method of claim 18 wherein step (L) comprises the step of the web-based post office application e-mailing the new scanned document to a different user.

21. The method of claim 18 wherein step (L) comprises the step of the web-based post office application storing the new scanned document in a network location.

22. The method of claim 18 wherein step (L) comprises the step of the web-based post office application processing the new scanned document to generate the new scanned document in a different format.

23. The method of claim 18 wherein step (L) comprises the step of the web-based post office application e-mailing a link to the new scanned document stored by the post office application to a post office.

24. An article of manufacture comprising software stored on a non-transitory computer readable storage medium, the software comprising:
  a post office application in a post office that includes an interface for a user to input a first stamp number corresponding to the user and to specify document processing instructions corresponding to the first stamp number that are stored in the post office;
  a mailman application that receives a new scanned document, processes the new scanned document to determine a second stamp number on a stamp on the new scanned document, where the second stamp number comprises an identification number on the stamp, wherein the identification number on the stamp is the same for each stamp in a roll of stamps assigned to the user, the mailman application including an interface for communicating with the post office application; and
  the post office application receiving from the mailman application the second stamp number corresponding to the new scanned document, determining the second stamp number matches the first stamp number entered by the user; determining from the user input the document processing instructions corresponding to the first stamp number, and returning to the mailman application the document processing instructions corresponding to the first stamp number that define how to process the new scanned document.

25. The article of manufacture of claim 24 wherein the post office application is a web-based application, and the interface for communicating with the post office application comprises information for accessing the post office application.

26. The article of manufacture of claim 24 wherein the mail man application processes the new scanned document according to the document processing instructions corresponding to the first stamp number.

27. The article of manufacture of claim 24 wherein the document processing instructions specify to e-mail the new scanned document to the user.

28. The article of manufacture of claim 24 wherein the document processing instructions specify to e-mail the new scanned document to a different user.

29. The article of manufacture of claim 24 wherein the document processing instructions specify to store the new scanned document in a network location.

30. The article of manufacture of claim 24 wherein the document processing instructions specify to process the new scanned document to generate the new scanned document in a different format.

31. The article of manufacture of claim 24 wherein the document processing instructions specify to e-mail a link to the new scanned document stored in the post office.

* * * * *